United States Patent
Mullen et al.

(10) Patent No.: US 7,836,856 B2
(45) Date of Patent: Nov. 23, 2010

(54) WATER HEATER WITH CONDENSING FLUE

(75) Inventors: Terrence J. Mullen, Waunakee, WI (US); Michael B. Steinhafel, Madison, WI (US)

(73) Assignee: Bock Water Heaters, Inc., Madison, WI (US)

( * ) Notice: Subject to any disclaimer, the term of this patent is extended or adjusted under 35 U.S.C. 154(b) by 439 days.

(21) Appl. No.: 11/955,852

(22) Filed: Dec. 13, 2007

(65) Prior Publication Data

US 2009/0151653 A1  Jun. 18, 2009

(51) Int. Cl.
 *F24H 1/52* (2006.01)
(52) U.S. Cl. .......... 122/155.2; 122/13.01; 122/18.1; 122/155.1
(58) Field of Classification Search ............ 122/155.1, 122/155.2, 155.3, 155.4, 169, 183, 13.01, 122/18.1
See application file for complete search history.

(56) References Cited

U.S. PATENT DOCUMENTS

| | | | |
|---|---|---|---|
| 2,147,046 A | 2/1939 | Leoni | |
| 2,286,677 A | 6/1942 | Greth | |
| 2,937,625 A | 5/1960 | Meyers | |
| 4,426,037 A * | 1/1984 | Bernstein | 237/19 |
| 4,492,185 A * | 1/1985 | Kendall et al. | 122/32 |
| 4,641,631 A * | 2/1987 | Jatana | 126/101 |
| 4,679,528 A | 7/1987 | Krans et al. | |
| 4,766,883 A * | 8/1988 | Cameron et al. | 122/14.21 |
| 4,782,815 A | 11/1988 | Friedman et al. | |
| 4,993,402 A * | 2/1991 | Ripka | 122/18.2 |
| 5,022,352 A * | 6/1991 | Osborne et al. | 122/17.2 |
| 5,228,413 A | 7/1993 | Tam | |
| 5,365,888 A | 11/1994 | Aronov | |
| 5,485,879 A | 1/1996 | Lannes | |
| 5,687,678 A | 11/1997 | Suchomel et al. | |
| 5,735,237 A * | 4/1998 | Phillip et al. | 122/18.5 |
| 5,782,208 A | 7/1998 | Lackstrom et al. | |
| 5,816,199 A | 10/1998 | Khizh et al. | |
| 6,230,665 B1 * | 5/2001 | Reynolds et al. | 122/13.01 |
| RE37,240 E * | 6/2001 | Moore et al. | 122/406.1 |
| 6,334,411 B1 | 1/2002 | Lesage et al. | |
| 6,354,248 B1 * | 3/2002 | Bourke | 122/18.31 |
| 6,418,883 B2 * | 7/2002 | Bourke et al. | 122/14.31 |

(Continued)

OTHER PUBLICATIONS

Vertex™ water heater, A.O. Smith company pamphlet.

(Continued)

*Primary Examiner*—Gregory A Wilson
(74) *Attorney, Agent, or Firm*—Stiennon & Stiennon

(57) ABSTRACT

A water heater has a burner positioned below a vertical centrally located flue with heat exchange capacity enhanced by a multiplicity of rectangular metal fins which are welded on the inside of the vertical central flue. The central flue extends upwardly within a water tank. The central flue transitions to a smaller diameter downwardly draining helically coiled condensing flue. Approximately 80% of the heat from the combustion gases is transferred to the water within the water tank through the wall of the central flue without condensation. An additional 10% or more of the combustion heat is transferred to the water accompanied by condensation of water in the coiled flue. A fan draws the combustion gases through the central flue and the coiled condensing flue and supplies the combustion gases to an exterior vent.

15 Claims, 1 Drawing Sheet

U.S. PATENT DOCUMENTS

| | | |
|---|---|---|
| 6,435,174 B1 | 8/2002 | Spilde et al. |
| 6,725,811 B1 * | 4/2004 | Moore et al. ............. 122/13.01 |
| 6,957,629 B1 * | 10/2005 | Steinhafel et al. ........ 122/155.2 |
| 7,258,080 B2 * | 8/2007 | Missoum et al. ........... 122/18.1 |
| 2003/0123863 A1 | 7/2003 | Hughes et al. |

OTHER PUBLICATIONS

Cyclone Xi™ water heater, A.O. Smith company pamphlet.
Polaris® water heater, American Water Heaters company pamphlet.

* cited by examiner

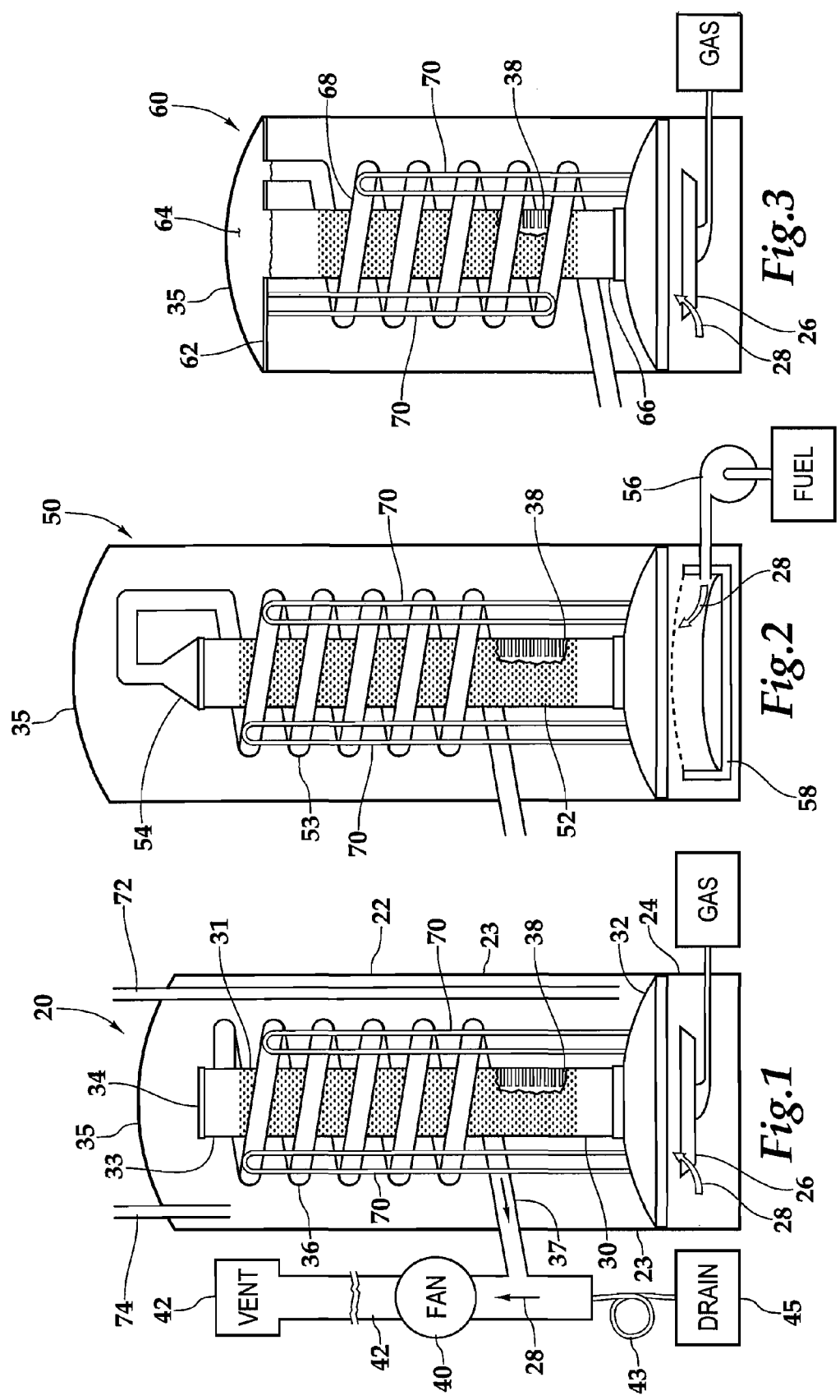

WATER HEATER WITH CONDENSING FLUE

BACKGROUND OF THE INVENTION

The present invention relates to water heaters in general and to bottom fired central flue water heaters with internal heat exchange structures in particular.

Heat exchange between a liquid and a gas is a process which has many industrial and domestic applications. Perhaps one of the most widely used applications of heat exchange between a gas and a liquid is in heating hot water. Typically a hot water heater has a tank which holds the water to be heated, and a burner producing hot combustion gases. The water is heated by the combustion of fuel with air in the burner to produce combustion gases which heat the bottom of the tank and are vented through a centrally located flue/heat exchanger which extends through the hot water tank. Two considerations which are paramount in the design of a hot water heater are durability and efficiency. Ever since the early 1970s there has been a heightened awareness of the importance of efficiency for cost, environmental, and geopolitical reasons. Efficiency is a measure of how effectively the heat energy present in the fuel is transferred to the water contained within the hot water heater tank.

The combustion gases pass up through the central flue, exchanging heat with the wall of the flue and with the water contained within the water tank. It has long been known that internal baffles within the central flue can increase heat transfer between the flue gases and the water within the water tank. The baffles perform three basic functions. First, the baffles slow the passage of the combustion gases through the flue, giving more time for heat transfer between the gases and the flue wall. Second, the baffles mix the combustion gases within the flue, bringing more of the flue gases into contact with the flue wall which transfers heat to the water. Third, the baffles conduct heat to the wall of the flue.

As efforts are made to increase efficiency, i.e. the percentage of the combustion energy which is transferred to the hot water, at some point increased efficiency requires utilizing heat released by condensing water vapor which is produced by the hydrogen contained in the common gaseous or liquid fuels. Because the latent heat of water vapor is relatively high, approximately a thousand BTUs per pound, a relatively large amount of the energy of combustion is contained in the latent heat of evaporation of the water vapor or steam, formed as a combustion byproduct. A pound of natural gas when combusted with dry air will produce about 2¼ pounds of water, a pound of heating oil will produce approximately 1.4 pound of water. When the relative heating values of the fuels are taken into account approximately 7% of the heat of combustion of number two oil is contained in the latent heat of the water produced during combustion, and approximately 10% of the heat of combustion of natural gas is contained in the latent heat of the water produced during combustion. Therefore, a number of gas water heaters have been developed which employ heat exchangers which condense at least some of the water contained in the flue gases. Such systems have been described as having efficiencies of 90 to 96%. Condensing heat exchangers must be arranged to drain downwardly, and must be designed to overcome the corrosion potential of liquid water, which often contains small amounts of potentially corrosive contaminants from the intake air or from the combustion gases.

What is needed is a water heater which utilizes the heat transfer capabilities of a finned flue, but achieves greater efficiencies by also utilizing a condensing flue while at the same time preventing water from entering the finned flue.

SUMMARY OF THE INVENTION

The water heater of this invention has a burner which produces hot combustion gases which move upwardly into a vertical centrally located flue and heat exchanger positioned in a water tank. The heat exchange capacity of the vertical flue is enhanced by a multiplicity of rectangular metal fins which are welded in a helical arrangement on the inside of the vertical flue. Approximately 80% of the heat from the combustion gases is transferred to the water within the water tank through the wall of the vertical flue. The heat transfer is arranged so that the water vapor in the combustion gases does not condense in the vertical flue, where the liquid water could cause corrosion problems with the bare steel of the vertical flue and heat exchange metal fins welded thereto. Further heat is extracted, approximately ten percent or more, in a second condensing flue which is arranged to receive the combustion gases at the top of the vertical flue. The second flue is arranged in the shape of a downward helical tube. After combustion gases pass through a central flue they enter into this second narrower flue which forms a helix around the centrally located flue and extends downwardly within the water tank with sufficient heat exchange area in contact with water within the water tank to at least partially condense water vapor from the combustion gases. The helical flue then exits the water tank and is connected to a water drain through a gas trap and to an exhaust vent pipe which conducts the exhaust gases outside of the building containing the water heater. A fan mounted in the exhaust pipe is used to draw combustion gases through the central flue and the helical flue, and to force combustion gases through the exhaust pipe.

It is an object of the present invention to provide a water heater which combines the advantages of a finned central flue with a condensing flue.

It is a further object of the present invention to provide a water heater with a condensing flue with lower resistance to gas flow.

It is another object of the present invention to provide a water heater wherein the heat transfer in the vertical flue can readily be adjusted by the number and placement of fins in the central flue.

It is yet another object of the present invention to provide a bottom fired atmospheric burner water heater with a condensing flue.

Further objects, features and advantages of the invention will be apparent from the following detailed description when taken in conjunction with the accompanying drawings.

BRIEF DESCRIPTION OF THE DRAWINGS

FIG. 1 is a schematic side elevational view partially cut away in section of the water heater of this invention.

FIG. 2 is a schematic side elevational view partially cut away in section of an alternative embodiment of the water heater of this invention.

FIG. 3 is a schematic side elevational view partially cut away in section of a further alternative embodiment of the water heater of this invention.

DESCRIPTION OF THE PREFERRED EMBODIMENTS

Referring more particularly to FIGS. 1-3 wherein like numbers refer to similar parts, a water heater 20 is shown in FIG. 1. The water heater 20 has a water tank 22 with an outer cylindrical wall 23. The water heater 20 has a combustion chamber 24 positioned below the water tank 22 which contains an atmospheric gas burner 26. The burner 26 supplies combustion gases indicated by arrows 28 to a straight central cylindrical flue 30 which extends upwardly from a convex dome 32 forming the bottom of the water tank 22. The central cylindrical flue 30 has a cylindrical wall 31. The central flue 30 terminates at a cap 34 beneath the upper convex dome 35 of the water heater tank 22. A condensing flue 36 is joined to the central flue 30 at a penetration formed in the central flue cylindrical wall 31 at an upper portion 33 of the central flue 30. The combustion gases flow into the condensing flue 36 which extends helically downwardly in the water tank 22 terminating in a strait section 37 which passes through the outer wall 23 of the water tank 22 and connects to an upwardly extending vent 42. A fan 40 is arranged in the vent 42 to draw combustion gases through the central flue 30 and the helical condensing flue 36. Water from the condensing flue 36 is drained to a drain 45 through a water trap 43 formed from a loop of hose.

In the water heater 20 heat is exchanged between the lower dome 32, the central flue 30, the helical flue 36, and the water contained in the water tank 22 of the water heater 20. As hot combustion gases 28 flow up through the central flue, 30, the flow of hot combustion gases is mixed and impeded by a multiplicity of mild steel fins 38 which form the fins within the central flue 30. Each fin 38 has a generally rectangular plan, i.e., two long sides and two short sides, and has a thickness of, for example, ⅛ or ¼ inches and extends radially inwardly substantially toward the axis of the cylindrical flue 30. In FIGS. 1-3, the central flues 30, 52, 66 show the location of the fins as stippled portions of the flues. The design of the central flue and the placement of the fins forming heat exchanging fins is described more completely in U.S. Pat. No. 6,957,629 which issued on Oct. 25, 2005, and in U.S. Pat. No. 4,761,532 which issued on Aug. 2, 1988, the disclosures of both of which are incorporated herein by reference. The helical flue may be formed of, for example, 1½ inch or 2 inch OD diameter mild steel tube with 16 gage walls i.e., 0.0598 inch wall thickness. Although the helical flue may be constructed of corrosion resistant materials such as stainless steel, for cost considerations the preferred material is mild steel tube which has been coated with a glass ceramic coating on the outside as well as on the inside, at least where the tube interior comes into contact with liquid water.

Heat exchange between the central flue 30 and the water in the water tank 22 is adjusted during design by selecting a central flue diameter which is between 4 and 16 inches, more practically between 8 and 12 inches, and choosing the number and arrangement of fins 38 such that approximately 80-82% of the heat of the combustion gases is transferred to the water in the water tank 22 through the central flue. This is substantially all the heat that can be transferred without condensation in the central flue 30. The lack of condensation allows the central flue to be manufactured of mild steel without an internal glass coating which would be subject to cracking and which would slow the transfer between the central flue and water in the water tank 22. Heat exchange between the combustion gases and the helical flue is arranged to extract approximately an additional 10% of the heat of the combustion gases, raising the total efficiency of the central flue, so as to produce a finned flue, helical flue combination with 90% or better totally efficiency. Thus approximately 90% of the heat transfer between the combustion gases in the water in the tank takes place in the central flue 30, although this range may vary between about 75% to 93%. In selecting the condensing flue helical length and diameter, as much of the remaining heat as possible may be extracted in a trade off with limiting the total flow resistance with its impact on fan cost and reliability. It is also to be noted that in accordance with the universal gas law, as the temperature of the combustion gases falls, the volume of the combustion gases falls so that by constructing a large diameter, for example 8 inches, central flue 30 which removes as much heat as possible without condensation by means of the fins formed by the fins 38, the volume of the gas and thus the flow resistance of the gas in the helical flue of small diameter is minimized. A water heater 20 of this invention combines the advantages of a conventional finned central heat exchanger forming a dry heat exchanger with low gas flow resistance with a relatively short condensing helical flue. This arrangement of large central flue combined with a relatively short helical condensing flue minimizes the inherent higher resistance of the narrower and longer helical flue.

The design of the water heater 20 also facilitates conventional construction of the combustion chamber 24 either with an atmospheric burner 26, as shown in FIGS. 1 and 3, or a power burner 56 which employs a fan, and fires into a refractory 58 such as shown in FIG. 2. The burner 56 may produce for example 75,000 to 750,000 BTU/hr or more particularly between 199,000 and 300,000 BTU/hr. The water heater 20 incorporates a conventional water inlet pipe 72 and a water outlet 74. The inlet and outlet for clarity are not shown in FIGS. 2 and 3.

An alternative embodiment water heater 50, shown in FIG. 2, has a central flue 52 which is terminated by an in-line transition section 54 which forms a conical taper which acts as a contraction between the diameter of the central cylindrical flue 52 and the diameter of the condensing flue 53, for example between an 8 inch central flue and a 2 inch condensing flue. The water heater 50 is illustrated with a forced air burner 56 which fires into a refractory 58 such as illustrated in U.S. Pat. No. 6,957,629. Such an arrangement can be used with either oil or gas as the source of fuel.

Another alternative embodiment water heater 60, shown in FIG. 3, includes a partition 62 positioned below the upper convex dome 35 of the water heater 60. The partition 62 forms a connecting combustion gas space 64 to which a central flue 66 and a helical flue 68 are connected. The central flue 66 is in combustion gas supplying relation to the space 64, and the helical flue 68 is in combustion gas receiving relation to the space.

It should be understood that where a single helical heat exchanger is shown, two or more helical heat exchangers could be used to lower flow resistance. It should also be understood that the equipment (not shown) conventional to all water heaters such as external insulation surrounding the water tank and combustion chamber, sacrificial anodes, or powered electrodes with the same function, pressure relief valves, clean out valves, flue vent dampers to prevent stand by heat loss, and the like will be employed in a conventional manner. In particular, connecting rods 70 are illustrated in FIGS. 1-3 connecting individual coils of the helical condensing flue 36, 53, 68 so as to support the helical flue to prevent vibration during transportation or as a result of water hammer. It should be understood that the upper and lower domes are defined to include convex, concave or flat structures serving the illustrated function.

It should be understood that it may be necessary to drain water from several places in the vent from both before, after, and internal to the fan as further water vapor condenses or condensed water as droplets coalesces on surfaces of the vent or fan.

It is understood that the invention is not limited to the particular construction and arrangement of parts herein illustrated and described, but embraces all such modified forms thereof as come within the scope of the following claims.

We claim:

1. A condensing flue water heater comprising:
    a water tank having a lower dome and an upper dome, and a cylindrical tank wall extending therebetween;
    a combustion chamber positioned under the water tank;
    a burner positioned within the combustion chamber;
    a straight cylindrical central flue of at least 4 inches in diameter extending upwardly toward the upper dome but not passing through the upper dome, the central flue having an inside diameter to which a multiplicity of rectangular metal fins are welded; and
    a condensing flue connected in gas-receiving relation to an upper portion of the central flue to receive all of the gas passing through the central flue, the condensing flue forming a helix extending downwardly from the upper portion of the central flue such the water drains freely from all portions of the condensing flue, the condensing flue extending through the cylindrical tank wall, to form an outlet, wherein the number and arrangement of the metal fins in the central flue is selected so that a heat exchange capacity of the central flue is about 75% to 93% of a heat transfer capacity of a combination of the central flue and the condensing flue.

2. The water heater of claim 1 further comprising a water trap connected to the outlet and leading to a drain.

3. The water heater of claim 1 further comprising a fan in air receiving relation connected to the outlet and connected in air supplying relation to a vent.

4. The water heater of claim 1 wherein the condensing flue is joined to the cylindrical wall of the straight cylindrical central flue, at portions of the cylindrical wall forming an opening therein and wherein the straight cylindrical central flue is terminated by a cap.

5. The water heater of claim 1 wherein the condensing flue is connected to a contraction of the central flue diameter.

6. The water heater of claim 5 wherein the contraction forms a conical taper between the diameter of the central cylindrical flue and the diameter of the condensing flue.

7. The water heater of claim 1 wherein a partition is positioned beneath the upper dome of the water heater to create a combustion gas space to which the central flue and the condensing flue are connected.

8. The water heater of claim 1 wherein the central flue is at least about 8 inches in diameter and the condensing flue is at least about 1½ inches in diameter.

9. The water heater of claim 1 wherein the burner has a capacity between about 199,000 and about 300,000 BTUs per hour.

10. A condensing flue water heater comprising:
    a water tank, having a lower dome and an upper dome, and a cylindrical tank wall there therebetween;
    a combustion chamber positioned under the water tank;
    a burner positioned within the combustion chamber;
    a straight cylindrical central flue of about 8 inches in diameter extending upwardly toward the upper dome but completely contained within the water tank the central flue having an inside diameter to which a multiplicity of rectangular metal fins are welded; and
    a condensing flue connected in gas receiving relation to an upper portion of the central flue to receive all of the gas passing through the central flue, the condensing flue forming a helix extending downwardly from the upper portion of the central flue such that water drains freely from all portions of the condensing flue, the condensing flue extending through the cylindrical tank wall, to form an outlet, the condensing flue being a tube at least about 1½ inches in diameter wherein the number and arrangement of the metal fins in the central flue is selected so that a heat exchange capacity of the central flue is about 75% to 93% of a heat transfer capacity of a combination of the central flue and the condensing flue;
    a water trap connected to the outlet leading to a drain; and
    a fan in air receiving relation connected to the outlet and connected in air supplying relation to a vent.

11. The water heater of claim 10 wherein the condensing flue is joined to the cylindrical wall of the straight cylindrical central flue, at portions of the cylindrical wall forming an opening therein and wherein the straight cylindrical central flue is terminated by a cap.

12. The water heater of claim 10 wherein the condensing flue is connected to a contraction of the central flue diameter.

13. The water heater of claim 12 wherein the contraction forms a conical taper between the diameter of the central cylindrical flue and the diameter of the condensing flue.

14. The water heater of claim 10 wherein a partition is positioned beneath the upper dome of the water heater to create a combustion gas space to which the central flue and the condensing flue are connected.

15. The water heater of claim 10 wherein the burner has a capacity between about 199,000 and about 300,000 BTUs per hour.

* * * * *

UNITED STATES PATENT AND TRADEMARK OFFICE
CERTIFICATE OF CORRECTION

| | | |
|---|---|---|
| PATENT NO. | : 7,836,856 B2 | Page 1 of 1 |
| APPLICATION NO. | : 11/955852 | |
| DATED | : November 23, 2010 | |
| INVENTOR(S) | : Terrence J. Mullen and Michael B. Steinhafel | |

It is certified that error appears in the above-identified patent and that said Letters Patent is hereby corrected as shown below:

Column 6, line 6, "tank wall there therebetween;" should be -- tank wall therebetween; --.

Signed and Sealed this

Twenty-seventh Day of September, 2011

David J. Kappos
*Director of the United States Patent and Trademark Office*